United States Patent
Ciesla et al.

(10) Patent No.: US 9,477,308 B2
(45) Date of Patent: Oct. 25, 2016

(54) USER INTERFACE SYSTEM

(71) Applicant: Tactus Technology, Inc., Fremont, CA (US)

(72) Inventors: Craig Michael Ciesla, Fremont, CA (US); Micah B. Yairi, Fremont, CA (US); Nathaniel Mark Saal, Fremont, CA (US)

(73) Assignee: Tactus Technology, Inc., Hayward, CA (US)

( * ) Notice: Subject to any disclaimer, the term of this patent is extended or adjusted under 35 U.S.C. 154(b) by 0 days.

(21) Appl. No.: 14/691,344

(22) Filed: Apr. 20, 2015

(65) Prior Publication Data

US 2015/0227205 A1  Aug. 13, 2015

Related U.S. Application Data

(63) Continuation of application No. 13/090,213, filed on Apr. 19, 2011, now Pat. No. 9,013,417.

(60) Provisional application No. 61/325,773, filed on Apr. 19, 2010.

(51) Int. Cl.
*G06F 3/01* (2006.01)
*G06F 3/041* (2006.01)

(52) U.S. Cl.
CPC ............. *G06F 3/016* (2013.01); *G06F 3/0412* (2013.01); *G06F 2203/04809* (2013.01)

(58) Field of Classification Search
CPC ................ G06F 3/016; G06F 3/0412; G06F 2203/04809
USPC ................... 345/173, 156; 715/702; 434/114
See application file for complete search history.

(56) References Cited

U.S. PATENT DOCUMENTS 2,885,967 A   5/1959   C et al.
3,034,628 A   5/1962   Wadey
(Continued)

FOREIGN PATENT DOCUMENTS

CN   1260525 A   7/2000
CN   1530818 A   9/2004
(Continued)

OTHER PUBLICATIONS

"Sharp Develops and Will Mass Produce New System LCD with Embedded Optical Sensors to Provide Input Capabilities Including Touch Screen and Scanner Functions," Sharp Press Release, Aug. 31, 2007, 3 pages, downloaded from the Internet at: http://sharp-world.com/corporate/news/070831.html.
(Continued)

*Primary Examiner* — Craig Schneider
*Assistant Examiner* — Josephine Trinidad-Borges
(74) *Attorney, Agent, or Firm* — Jeffrey Schox; Padowithz Alce

(57) ABSTRACT

A user interface system including a sheet that defines a surface and at least partially defines a first level fluid vessel arranged at a first level within the sheet and a second level fluid vessel arranged at a second level within the sheet, wherein both the first and second level fluid vessels are arranged underneath the surface; a first volume of fluid contained within the first level fluid vessel; a second volume of fluid contained within the second level fluid vessel; and a displacement device coupled to the first and second level fluid vessels that selectively manipulates the first and second volumes of fluid, thereby deforming a particular region of the surface to a first and second stage, respectively or deforming a first particular region and a second particular region of the surface, respectively.

21 Claims, 6 Drawing Sheets

(56) References Cited

U.S. PATENT DOCUMENTS

| | | |
|---|---|---|
| 3,441,111 A | 4/1969 | Spalding |
| 3,453,967 A | 7/1969 | L et al. |
| 3,490,733 A | 1/1970 | Jean |
| 3,659,354 A | 5/1972 | Sutherland |
| 3,759,108 A | 9/1973 | Borom et al. |
| 3,780,236 A | 12/1973 | Gross |
| 3,818,487 A | 6/1974 | Brody et al. |
| 4,109,118 A | 8/1978 | Kley |
| 4,181,476 A | 1/1980 | Malbec |
| 4,209,819 A | 6/1980 | Seignemartin |
| 4,290,343 A | 9/1981 | Gram |
| 4,307,268 A | 12/1981 | Harper |
| 4,467,321 A | 8/1984 | Volnak |
| 4,477,700 A | 10/1984 | Balash et al. |
| 4,517,421 A | 5/1985 | Margolin |
| 4,543,000 A | 9/1985 | Hasenbalg |
| 4,584,625 A | 4/1986 | Kellogg |
| 4,700,025 A | 10/1987 | Hatayama et al. |
| 4,743,895 A | 5/1988 | Alexander |
| 4,772,205 A | 9/1988 | Chlumsky et al. |
| 4,920,343 A | 4/1990 | Schwartz |
| 4,940,734 A | 7/1990 | Ley et al. |
| 5,090,297 A | 2/1992 | Paynter |
| 5,194,852 A | 3/1993 | More et al. |
| 5,195,659 A | 3/1993 | Eiskant |
| 5,212,473 A | 5/1993 | Louis |
| 5,222,895 A | 6/1993 | Fricke |
| 5,286,199 A | 2/1994 | Kipke |
| 5,346,476 A | 9/1994 | Elson |
| 5,369,228 A | 11/1994 | Faust |
| 5,412,189 A | 5/1995 | Cragun |
| 5,459,461 A | 10/1995 | Crowley et al. |
| 5,470,212 A | 11/1995 | Pearce |
| 5,488,204 A | 1/1996 | Mead et al. |
| 5,496,174 A | 3/1996 | Garner |
| 5,666,112 A | 9/1997 | Crowley et al. |
| 5,717,423 A | 2/1998 | Parker |
| 5,729,222 A | 3/1998 | Iggulden et al. |
| 5,742,241 A | 4/1998 | Crowley et al. |
| 5,754,023 A | 5/1998 | Roston et al. |
| 5,766,013 A | 6/1998 | Vuyk |
| 5,767,839 A | 6/1998 | Rosenberg |
| 5,835,080 A | 11/1998 | Beeteson et al. |
| 5,880,411 A | 3/1999 | Gillespie et al. |
| 5,889,236 A | 3/1999 | Gillespie et al. |
| 5,917,906 A | 6/1999 | Thornton |
| 5,943,043 A | 8/1999 | Furuhata et al. |
| 5,977,867 A | 11/1999 | Blouin |
| 5,982,304 A | 11/1999 | Selker et al. |
| 6,067,116 A | 5/2000 | Yamano et al. |
| 6,154,198 A | 11/2000 | Rosenberg |
| 6,154,201 A | 11/2000 | Levin et al. |
| 6,160,540 A | 12/2000 | Fishkin et al. |
| 6,169,540 B1 | 1/2001 | Rosenberg et al. |
| 6,187,398 B1 | 2/2001 | Eldridge |
| 6,188,391 B1 | 2/2001 | Seely et al. |
| 6,218,966 B1 | 4/2001 | Goodwin et al. |
| 6,243,074 B1 | 6/2001 | Fishkin et al. |
| 6,243,078 B1 | 6/2001 | Rosenberg |
| 6,268,857 B1 | 7/2001 | Fishkin et al. |
| 6,271,828 B1 | 8/2001 | Rosenberg et al. |
| 6,278,441 B1 | 8/2001 | Gouzman et al. |
| 6,300,937 B1 | 10/2001 | Rosenberg |
| 6,310,614 B1 | 10/2001 | Maeda et al. |
| 6,323,846 B1 | 11/2001 | Westerman et al. |
| 6,337,678 B1 | 1/2002 | Fish |
| 6,354,839 B1 | 3/2002 | Schmidt et al. |
| 6,356,259 B1 | 3/2002 | Maeda et al. |
| 6,359,572 B1 | 3/2002 | Vale |
| 6,366,272 B1 | 4/2002 | Rosenberg et al. |
| 6,369,803 B2 | 4/2002 | Brisebois et al. |
| 6,384,743 B1 | 5/2002 | Vanderheiden |
| 6,414,671 B1 | 7/2002 | Gillespie et al. |
| 6,429,846 B2 | 8/2002 | Rosenberg et al. |
| 6,437,771 B1 | 8/2002 | Rosenberg et al. |
| 6,462,294 B2 | 10/2002 | Davidson et al. |
| 6,469,692 B2 | 10/2002 | Rosenberg |
| 6,486,872 B2 | 11/2002 | Rosenberg et al. |
| 6,498,353 B2 | 12/2002 | Nagle et al. |
| 6,501,462 B1 | 12/2002 | Garner |
| 6,509,892 B1 | 1/2003 | Cooper et al. |
| 6,529,183 B1 | 3/2003 | MacLean et al. |
| 6,573,844 B1 | 6/2003 | Venolia et al. |
| 6,636,202 B2 | 10/2003 | Ishmael et al. |
| 6,639,581 B1 | 10/2003 | Moore et al. |
| 6,655,788 B1 | 12/2003 | Freeman |
| 6,657,614 B1 | 12/2003 | Ito et al. |
| 6,667,738 B2 | 12/2003 | Murphy |
| 6,681,031 B2 | 1/2004 | Cohen et al. |
| 6,683,627 B1 | 1/2004 | Ullmann et al. |
| 6,686,911 B1 | 2/2004 | Levin et al. |
| 6,697,086 B2 | 2/2004 | Rosenberg et al. |
| 6,700,556 B2 | 3/2004 | Richley et al. |
| 6,703,924 B2 | 3/2004 | Tecu et al. |
| 6,743,021 B2 | 6/2004 | Prince et al. |
| 6,788,295 B1 | 9/2004 | Inkster |
| 6,819,316 B2 | 11/2004 | Schulz et al. |
| 6,850,222 B1 | 2/2005 | Rosenberg |
| 6,861,961 B2 | 3/2005 | Sandbach et al. |
| 6,877,986 B2 | 4/2005 | Fournier et al. |
| 6,881,063 B2 | 4/2005 | Yang |
| 6,930,234 B2 | 8/2005 | Davis |
| 6,937,225 B1 | 8/2005 | Kehlstadt et al. |
| 6,975,305 B2 | 12/2005 | Yamashita |
| 6,979,164 B2 | 12/2005 | Kramer |
| 6,982,696 B1 | 1/2006 | Shahoian |
| 6,995,745 B2 | 2/2006 | Boon et al. |
| 7,004,655 B2 | 2/2006 | Ferrara |
| 7,015,894 B2 | 3/2006 | Morohoshi |
| 7,027,032 B2 | 4/2006 | Rosenberg et al. |
| 7,056,051 B2 | 6/2006 | Fiffie |
| 7,061,467 B2 | 6/2006 | Rosenberg |
| 7,064,655 B2 | 6/2006 | Murray et al. |
| 7,079,111 B2 | 7/2006 | Ho |
| 7,081,888 B2 | 7/2006 | Cok et al. |
| 7,096,852 B2 | 8/2006 | Gregorio |
| 7,102,541 B2 | 9/2006 | Rosenberg |
| 7,104,152 B2 | 9/2006 | Levin et al. |
| 7,106,305 B2 | 9/2006 | Rosenberg |
| 7,106,313 B2 | 9/2006 | Schena et al. |
| 7,109,967 B2 | 9/2006 | Hioki et al. |
| 7,112,737 B2 | 9/2006 | Ramstein |
| 7,113,166 B1 | 9/2006 | Rosenberg et al. |
| 7,116,317 B2 | 10/2006 | Gregorio et al. |
| 7,124,425 B1 | 10/2006 | Anderson, Jr. et al. |
| 7,129,854 B2 | 10/2006 | Arneson et al. |
| 7,131,073 B2 | 10/2006 | Rosenberg et al. |
| 7,136,045 B2 | 11/2006 | Rosenberg et al. |
| 7,138,977 B2 | 11/2006 | Kinerk et al. |
| 7,138,985 B2 | 11/2006 | Nakajima |
| 7,143,785 B2 | 12/2006 | Maerkl et al. |
| 7,144,616 B1 | 12/2006 | Unger et al. |
| 7,148,875 B2 | 12/2006 | Rosenberg et al. |
| 7,151,432 B2 | 12/2006 | Tierling |
| 7,151,527 B2 | 12/2006 | Culver |
| 7,151,528 B2 | 12/2006 | Taylor et al. |
| 7,154,470 B2 | 12/2006 | Tierling |
| 7,158,112 B2 | 1/2007 | Rosenberg et al. |
| 7,159,008 B1 | 1/2007 | Wies et al. |
| 7,161,276 B2 | 1/2007 | Face |
| 7,161,580 B2 | 1/2007 | Bailey et al. |
| 7,168,042 B2 | 1/2007 | Braun et al. |
| 7,176,903 B2 | 2/2007 | Katsuki et al. |
| 7,182,691 B1 | 2/2007 | Schena |
| 7,191,191 B2 | 3/2007 | Peurach et al. |
| 7,193,607 B2 | 3/2007 | Moore et al. |
| 7,195,170 B2 | 3/2007 | Matsumoto et al. |
| 7,196,688 B2 | 3/2007 | Schena |
| 7,198,137 B2 | 4/2007 | Olien |
| 7,199,790 B2 | 4/2007 | Rosenberg et al. |
| 7,202,851 B2 | 4/2007 | Cunningham et al. |
| 7,205,981 B2 | 4/2007 | Cunningham |
| 7,208,671 B2 | 4/2007 | Chu |
| 7,209,028 B2 | 4/2007 | Boronkay et al. |

(56) References Cited

U.S. PATENT DOCUMENTS

| | | |
|---|---|---|
| 7,209,113 B2 | 4/2007 | Park |
| 7,209,117 B2 | 4/2007 | Rosenberg et al. |
| 7,209,118 B2 | 4/2007 | Shahoian et al. |
| 7,210,160 B2 | 4/2007 | Anderson, Jr. et al. |
| 7,215,326 B2 | 5/2007 | Rosenberg |
| 7,216,671 B2 | 5/2007 | Unger et al. |
| 7,218,310 B2 | 5/2007 | Tierling et al. |
| 7,218,313 B2 | 5/2007 | Marcus et al. |
| 7,233,313 B2 | 6/2007 | Levin et al. |
| 7,233,315 B2 | 6/2007 | Gregorio et al. |
| 7,233,476 B2 | 6/2007 | Goldenberg et al. |
| 7,236,157 B2 | 6/2007 | Schena et al. |
| 7,245,202 B2 | 7/2007 | Levin |
| 7,245,292 B1 | 7/2007 | Custy |
| 7,249,951 B2 | 7/2007 | Bevirt et al. |
| 7,250,128 B2 | 7/2007 | Unger et al. |
| 7,253,803 B2 | 8/2007 | Schena et al. |
| 7,253,807 B2 | 8/2007 | Nakajima |
| 7,265,750 B2 | 9/2007 | Rosenberg |
| 7,280,095 B2 | 10/2007 | Grant |
| 7,283,120 B2 | 10/2007 | Grant |
| 7,283,123 B2 | 10/2007 | Braun et al. |
| 7,283,696 B2 | 10/2007 | Ticknor et al. |
| 7,289,106 B2 | 10/2007 | Bailey et al. |
| 7,289,111 B2 | 10/2007 | Asbill |
| 7,307,619 B2 | 12/2007 | Cunningham et al. |
| 7,308,831 B2 | 12/2007 | Cunningham et al. |
| 7,319,374 B2 | 1/2008 | Shahoian |
| 7,336,260 B2 | 2/2008 | Martin et al. |
| 7,336,266 B2 | 2/2008 | Hayward et al. |
| 7,339,572 B2 | 3/2008 | Schena |
| 7,339,580 B2 | 3/2008 | Westerman et al. |
| 7,342,573 B2 | 3/2008 | Ryynaenen |
| 7,355,595 B2 | 4/2008 | Bathiche et al. |
| 7,369,115 B2 | 5/2008 | Cruz-Hernandez et al. |
| 7,382,357 B2 | 6/2008 | Panotopoulos et al. |
| 7,390,157 B2 | 6/2008 | Kramer |
| 7,391,861 B2 | 6/2008 | Levy |
| 7,397,466 B2 | 7/2008 | Bourdelais et al. |
| 7,403,191 B2 | 7/2008 | Sinclair |
| 7,432,910 B2 | 10/2008 | Shahoian |
| 7,432,911 B2 | 10/2008 | Skarine |
| 7,432,912 B2 | 10/2008 | Cote et al. |
| 7,433,719 B2 | 10/2008 | Dabov |
| 7,453,442 B1 | 11/2008 | Poynter |
| 7,471,280 B2 | 12/2008 | Prins |
| 7,489,309 B2 | 2/2009 | Levin et al. |
| 7,511,702 B2 | 3/2009 | Hotelling |
| 7,522,152 B2 | 4/2009 | Olien et al. |
| 7,545,289 B2 | 6/2009 | Mackey et al. |
| 7,548,232 B2 | 6/2009 | Shahoian et al. |
| 7,551,161 B2 | 6/2009 | Mann |
| 7,561,142 B2 | 7/2009 | Shahoian et al. |
| 7,567,232 B2 | 7/2009 | Rosenberg |
| 7,567,243 B2 | 7/2009 | Hayward |
| 7,589,714 B2 | 9/2009 | Funaki |
| 7,592,999 B2 | 9/2009 | Rosenberg et al. |
| 7,605,800 B2 | 10/2009 | Rosenberg |
| 7,609,178 B2 | 10/2009 | Son et al. |
| 7,656,393 B2 | 2/2010 | King et al. |
| 7,659,885 B2 | 2/2010 | Kraus et al. |
| 7,671,837 B2 | 3/2010 | Forsblad et al. |
| 7,679,611 B2 | 3/2010 | Schena |
| 7,679,839 B2 | 3/2010 | Polyakov et al. |
| 7,688,310 B2 | 3/2010 | Rosenberg |
| 7,701,438 B2 | 4/2010 | Chang et al. |
| 7,728,820 B2 | 6/2010 | Rosenberg et al. |
| 7,733,575 B2 | 6/2010 | Heim et al. |
| 7,743,348 B2 | 6/2010 | Robbins et al. |
| 7,755,602 B2 | 7/2010 | Tremblay et al. |
| 7,808,488 B2 | 10/2010 | Martin et al. |
| 7,834,853 B2 | 11/2010 | Finney et al. |
| 7,843,424 B2 | 11/2010 | Rosenberg et al. |
| 7,864,164 B2 | 1/2011 | Cunningham et al. |
| 7,869,589 B2 | 1/2011 | Tuovinen |
| 7,890,257 B2 | 2/2011 | Fyke et al. |
| 7,890,863 B2 | 2/2011 | Grant et al. |
| 7,920,131 B2 | 4/2011 | Westerman |
| 7,924,145 B2 | 4/2011 | Yuk et al. |
| 7,944,435 B2 | 5/2011 | Rosenberg et al. |
| 7,952,498 B2 | 5/2011 | Higa |
| 7,956,770 B2 | 6/2011 | Klinghult et al. |
| 7,973,773 B2 | 7/2011 | Pryor |
| 7,978,181 B2 | 7/2011 | Westerman |
| 7,978,183 B2 | 7/2011 | Rosenberg et al. |
| 7,978,186 B2 | 7/2011 | Vassallo et al. |
| 7,979,797 B2 | 7/2011 | Schena |
| 7,982,720 B2 | 7/2011 | Rosenberg et al. |
| 7,986,303 B2 | 7/2011 | Braun et al. |
| 7,986,306 B2 | 7/2011 | Eich et al. |
| 7,989,181 B2 | 8/2011 | Blattner et al. |
| 7,999,660 B2 | 8/2011 | Cybart et al. |
| 8,002,089 B2 | 8/2011 | Jasso et al. |
| 8,004,492 B2 | 8/2011 | Kramer et al. |
| 8,013,843 B2 | 9/2011 | Pryor |
| 8,020,095 B2 | 9/2011 | Braun et al. |
| 8,022,933 B2 | 9/2011 | Hardacker et al. |
| 8,031,181 B2 | 10/2011 | Rosenberg et al. |
| 8,044,826 B2 | 10/2011 | Yoo |
| 8,047,849 B2 | 11/2011 | Ahn et al. |
| 8,049,734 B2 | 11/2011 | Rosenberg et al. |
| 8,059,104 B2 | 11/2011 | Shahoian et al. |
| 8,059,105 B2 | 11/2011 | Rosenberg et al. |
| 8,063,892 B2 | 11/2011 | Shahoian et al. |
| 8,063,893 B2 | 11/2011 | Rosenberg et al. |
| 8,068,605 B2 | 11/2011 | Holmberg |
| 8,077,154 B2 | 12/2011 | Emig et al. |
| 8,077,440 B2 | 12/2011 | Krabbenborg et al. |
| 8,077,941 B2 | 12/2011 | Assmann |
| 8,094,121 B2 | 1/2012 | Obermeyer et al. |
| 8,094,806 B2 | 1/2012 | Levy |
| 8,103,472 B2 | 1/2012 | Braun et al. |
| 8,106,787 B2 | 1/2012 | Nurmi |
| 8,115,745 B2 | 2/2012 | Gray |
| 8,116,831 B2 | 2/2012 | Meitzler et al. |
| 8,123,660 B2 | 2/2012 | Kruse et al. |
| 8,125,347 B2 | 2/2012 | Fahn |
| 8,125,461 B2 | 2/2012 | Weber et al. |
| 8,130,202 B2 | 3/2012 | Levine et al. |
| 8,144,129 B2 | 3/2012 | Hotelling et al. |
| 8,144,271 B2 | 3/2012 | Han |
| 8,154,512 B2 | 4/2012 | Olien et al. |
| 8,154,527 B2 | 4/2012 | Ciesla et al. |
| 8,159,461 B2 | 4/2012 | Martin et al. |
| 8,162,009 B2 | 4/2012 | Chaffee |
| 8,164,573 B2 | 4/2012 | Dacosta et al. |
| 8,166,649 B2 | 5/2012 | Moore |
| 8,169,306 B2 | 5/2012 | Schmidt et al. |
| 8,169,402 B2 | 5/2012 | Shahoian et al. |
| 8,174,372 B2 | 5/2012 | Da Costa |
| 8,174,495 B2 | 5/2012 | Takashima et al. |
| 8,174,508 B2 | 5/2012 | Sinclair et al. |
| 8,174,511 B2 | 5/2012 | Takenaka et al. |
| 8,178,808 B2 | 5/2012 | Strittmatter |
| 8,179,375 B2 | 5/2012 | Ciesla et al. |
| 8,179,377 B2 | 5/2012 | Ciesla et al. |
| 8,188,989 B2 | 5/2012 | Levin et al. |
| 8,195,243 B2 | 6/2012 | Kim et al. |
| 8,199,107 B2 | 6/2012 | Xu et al. |
| 8,199,124 B2 | 6/2012 | Ciesla et al. |
| 8,203,094 B2 | 6/2012 | Mittleman et al. |
| 8,203,537 B2 | 6/2012 | Tanabe et al. |
| 8,207,950 B2 | 6/2012 | Ciesla et al. |
| 8,212,772 B2 | 7/2012 | Shahoian |
| 8,217,903 B2 | 7/2012 | Ma et al. |
| 8,217,904 B2 | 7/2012 | Kim |
| 8,223,278 B2 | 7/2012 | Kim et al. |
| 8,224,392 B2 | 7/2012 | Kim et al. |
| 8,228,305 B2 | 7/2012 | Pryor |
| 8,232,976 B2 | 7/2012 | Yun et al. |
| 8,243,038 B2 | 8/2012 | Ciesla et al. |
| 8,253,052 B2 | 8/2012 | Chen |
| 8,253,703 B2 | 8/2012 | Eldering |
| 8,279,172 B2 | 10/2012 | Braun et al. |

(56) References Cited

U.S. PATENT DOCUMENTS

| | | |
|---|---|---|
| 8,279,193 B1 | 10/2012 | Birnbaum et al. |
| 8,310,458 B2 | 11/2012 | Faubert et al. |
| 8,345,013 B2 | 1/2013 | Heubel et al. |
| 8,350,820 B2 | 1/2013 | Deslippe et al. |
| 8,362,882 B2 | 1/2013 | Heubel et al. |
| 8,363,008 B2 | 1/2013 | Ryu et al. |
| 8,367,957 B2 | 2/2013 | Strittmatter |
| 8,368,641 B2 | 2/2013 | Tremblay et al. |
| 8,378,797 B2 | 2/2013 | Pance et al. |
| 8,384,680 B2 | 2/2013 | Paleczny et al. |
| 8,390,594 B2 | 3/2013 | Modarres et al. |
| 8,390,771 B2 | 3/2013 | Sakai et al. |
| 8,395,587 B2 | 3/2013 | Cauwels et al. |
| 8,395,591 B2 | 3/2013 | Kruglick |
| 8,400,402 B2 | 3/2013 | Son |
| 8,400,410 B2 | 3/2013 | Taylor et al. |
| 8,547,339 B2 | 10/2013 | Ciesla |
| 8,587,541 B2 | 11/2013 | Ciesla et al. |
| 8,587,548 B2 | 11/2013 | Ciesla et al. |
| 8,749,489 B2 | 6/2014 | Ito et al. |
| 8,856,679 B2 | 10/2014 | Sirpal et al. |
| 8,922,503 B2 | 12/2014 | Ciesla et al. |
| 8,922,510 B2 | 12/2014 | Ciesla et al. |
| 8,928,621 B2 | 1/2015 | Ciesla et al. |
| 8,970,403 B2 | 3/2015 | Ciesla et al. |
| 9,035,898 B2 | 5/2015 | Ciesla |
| 9,075,429 B1 | 7/2015 | Karakotsios |
| 9,116,617 B2 | 8/2015 | Ciesla et al. |
| 9,274,612 B2 | 3/2016 | Ciesla et al. |
| 9,274,635 B2 | 3/2016 | Birnbaum |
| 2001/0008396 A1 | 7/2001 | Komata |
| 2001/0043189 A1 | 11/2001 | Brisebois et al. |
| 2002/0063694 A1 | 5/2002 | Keely et al. |
| 2002/0104691 A1 | 8/2002 | Kent et al. |
| 2002/0106614 A1 | 8/2002 | Prince et al. |
| 2002/0110237 A1 | 8/2002 | Krishnan |
| 2002/0125084 A1 | 9/2002 | Kreuzer et al. |
| 2002/0149570 A1 | 10/2002 | Knowles et al. |
| 2002/0180620 A1 | 12/2002 | Gettemy et al. |
| 2003/0087698 A1 | 5/2003 | Nishiumi et al. |
| 2003/0117371 A1 | 6/2003 | Roberts et al. |
| 2003/0179190 A1 | 9/2003 | Franzen |
| 2003/0206153 A1 | 11/2003 | Murphy |
| 2003/0223799 A1 | 12/2003 | Pihlaja |
| 2004/0001589 A1 | 1/2004 | Mueller et al. |
| 2004/0056876 A1 | 3/2004 | Nakajima |
| 2004/0056877 A1 | 3/2004 | Nakajima |
| 2004/0106360 A1 | 6/2004 | Farmer et al. |
| 2004/0114324 A1 | 6/2004 | Kusaka et al. |
| 2004/0164968 A1 | 8/2004 | Miyamoto |
| 2004/0178006 A1 | 9/2004 | Cok |
| 2005/0007339 A1 | 1/2005 | Sato |
| 2005/0007349 A1 | 1/2005 | Vakil et al. |
| 2005/0020325 A1 | 1/2005 | Enger et al. |
| 2005/0030292 A1 | 2/2005 | Diederiks |
| 2005/0057528 A1 | 3/2005 | Kleen |
| 2005/0073506 A1 | 4/2005 | Durso |
| 2005/0088417 A1 | 4/2005 | Mulligan |
| 2005/0110768 A1 | 5/2005 | Marriott et al. |
| 2005/0162408 A1 | 7/2005 | Martchovsky |
| 2005/0212773 A1 | 9/2005 | Asbill |
| 2005/0231489 A1 | 10/2005 | Ladouceur et al. |
| 2005/0253816 A1 | 11/2005 | Himberg et al. |
| 2005/0270444 A1 | 12/2005 | Miller et al. |
| 2005/0285846 A1 | 12/2005 | Funaki |
| 2006/0026521 A1 | 2/2006 | Hotelling et al. |
| 2006/0026535 A1 | 2/2006 | Hotelling et al. |
| 2006/0053387 A1 | 3/2006 | Ording |
| 2006/0087479 A1 | 4/2006 | Sakurai et al. |
| 2006/0097991 A1 | 5/2006 | Hotelling et al. |
| 2006/0098148 A1 | 5/2006 | Kobayashi et al. |
| 2006/0118610 A1 | 6/2006 | Pihlaja et al. |
| 2006/0119586 A1 | 6/2006 | Grant et al. |
| 2006/0152474 A1 | 7/2006 | Saito et al. |
| 2006/0154216 A1 | 7/2006 | Hafez et al. |
| 2006/0197753 A1 | 9/2006 | Hotelling |
| 2006/0214923 A1 | 9/2006 | Chiu et al. |
| 2006/0238495 A1 | 10/2006 | Davis |
| 2006/0238510 A1 | 10/2006 | Panotopoulos et al. |
| 2006/0238517 A1 | 10/2006 | King et al. |
| 2006/0256075 A1 | 11/2006 | Anastas et al. |
| 2006/0278444 A1 | 12/2006 | Binstead |
| 2007/0013662 A1 | 1/2007 | Fauth |
| 2007/0036492 A1 | 2/2007 | Lee |
| 2007/0085837 A1 | 4/2007 | Ricks et al. |
| 2007/0108032 A1 | 5/2007 | Matsumoto et al. |
| 2007/0122314 A1 | 5/2007 | Strand et al. |
| 2007/0130212 A1 | 6/2007 | Peurach et al. |
| 2007/0152982 A1 | 7/2007 | Kim et al. |
| 2007/0152983 A1 | 7/2007 | Mckillop et al. |
| 2007/0165004 A1 | 7/2007 | Seelhammer et al. |
| 2007/0171210 A1 | 7/2007 | Chaudhri et al. |
| 2007/0182718 A1 | 8/2007 | Schoener et al. |
| 2007/0229233 A1 | 10/2007 | Dort |
| 2007/0229464 A1 | 10/2007 | Hotelling et al. |
| 2007/0236466 A1 | 10/2007 | Hotelling |
| 2007/0236469 A1 | 10/2007 | Woolley et al. |
| 2007/0247429 A1 | 10/2007 | Westerman |
| 2007/0257634 A1 | 11/2007 | Leschin et al. |
| 2007/0273561 A1 | 11/2007 | Philipp |
| 2007/0296702 A1 | 12/2007 | Strawn et al. |
| 2007/0296709 A1 | 12/2007 | Guanghai |
| 2008/0010593 A1 | 1/2008 | Uusitalo et al. |
| 2008/0024459 A1 | 1/2008 | Poupyrev et al. |
| 2008/0054875 A1 | 3/2008 | Saito |
| 2008/0062151 A1 | 3/2008 | Kent |
| 2008/0136791 A1 | 6/2008 | Nissar |
| 2008/0138774 A1 | 6/2008 | Ahn et al. |
| 2008/0143693 A1 | 6/2008 | Schena |
| 2008/0150911 A1 | 6/2008 | Harrison |
| 2008/0165139 A1 | 7/2008 | Hotelling et al. |
| 2008/0174321 A1 | 7/2008 | Kang et al. |
| 2008/0174570 A1 | 7/2008 | Jobs et al. |
| 2008/0202251 A1 | 8/2008 | Serban et al. |
| 2008/0238448 A1 | 10/2008 | Moore et al. |
| 2008/0248836 A1 | 10/2008 | Caine |
| 2008/0249643 A1 | 10/2008 | Nelson |
| 2008/0251368 A1 | 10/2008 | Holmberg et al. |
| 2008/0252607 A1 | 10/2008 | De Jong et al. |
| 2008/0266264 A1 | 10/2008 | Lipponen et al. |
| 2008/0286447 A1 | 11/2008 | Alden et al. |
| 2008/0291169 A1 | 11/2008 | Brenner et al. |
| 2008/0297475 A1 | 12/2008 | Woolf et al. |
| 2008/0303796 A1 | 12/2008 | Fyke |
| 2008/0312577 A1 | 12/2008 | Drasler et al. |
| 2008/0314725 A1 | 12/2008 | Karhiniemi et al. |
| 2009/0002140 A1 | 1/2009 | Higa |
| 2009/0002205 A1 | 1/2009 | Klinghult et al. |
| 2009/0002328 A1 | 1/2009 | Ullrich et al. |
| 2009/0002337 A1 | 1/2009 | Chang |
| 2009/0009480 A1 | 1/2009 | Heringslack |
| 2009/0015547 A1 | 1/2009 | Franz et al. |
| 2009/0028824 A1 | 1/2009 | Chiang et al. |
| 2009/0033617 A1 | 2/2009 | Lindberg et al. |
| 2009/0059495 A1 | 3/2009 | Matsuoka |
| 2009/0066672 A1 | 3/2009 | Tanabe et al. |
| 2009/0085878 A1 | 4/2009 | Heubel et al. |
| 2009/0106655 A1 | 4/2009 | Grant et al. |
| 2009/0115733 A1 | 5/2009 | Ma et al. |
| 2009/0115734 A1 | 5/2009 | Fredriksson et al. |
| 2009/0128376 A1 | 5/2009 | Caine et al. |
| 2009/0128503 A1 | 5/2009 | Grant et al. |
| 2009/0129021 A1 | 5/2009 | Dunn |
| 2009/0132093 A1 | 5/2009 | Arneson et al. |
| 2009/0135145 A1 | 5/2009 | Chen et al. |
| 2009/0140989 A1 | 6/2009 | Ahlgren |
| 2009/0160813 A1 | 6/2009 | Takashima et al. |
| 2009/0167508 A1 | 7/2009 | Fadell et al. |
| 2009/0167509 A1 | 7/2009 | Fadell et al. |
| 2009/0167567 A1 | 7/2009 | Halperin et al. |
| 2009/0167677 A1 | 7/2009 | Kruse et al. |

(56) References Cited

U.S. PATENT DOCUMENTS

| | | |
|---|---|---|
| 2009/0167704 A1 | 7/2009 | Terlizzi et al. |
| 2009/0174673 A1 | 7/2009 | Ciesla |
| 2009/0174687 A1 | 7/2009 | Ciesla et al. |
| 2009/0181724 A1 | 7/2009 | Pettersson |
| 2009/0182501 A1 | 7/2009 | Fyke et al. |
| 2009/0195512 A1 | 8/2009 | Pettersson |
| 2009/0207148 A1 | 8/2009 | Sugimoto et al. |
| 2009/0215500 A1 | 8/2009 | You et al. |
| 2009/0231305 A1 | 9/2009 | Hotelling et al. |
| 2009/0243998 A1 | 10/2009 | Wang |
| 2009/0250267 A1 | 10/2009 | Heubel et al. |
| 2009/0256817 A1 | 10/2009 | Perlin et al. |
| 2009/0273578 A1 | 11/2009 | Kanda et al. |
| 2009/0289922 A1 | 11/2009 | Henry |
| 2009/0303022 A1 | 12/2009 | Griffin et al. |
| 2009/0309616 A1 | 12/2009 | Klinghult |
| 2010/0043189 A1 | 2/2010 | Fukano |
| 2010/0045613 A1 | 2/2010 | Wu et al. |
| 2010/0073241 A1 | 3/2010 | Ayala et al. |
| 2010/0078231 A1 | 4/2010 | Yeh et al. |
| 2010/0079404 A1 | 4/2010 | Degner et al. |
| 2010/0090814 A1 | 4/2010 | Cybart et al. |
| 2010/0097323 A1 | 4/2010 | Edwards et al. |
| 2010/0103116 A1 | 4/2010 | Leung et al. |
| 2010/0103137 A1 | 4/2010 | Ciesla et al. |
| 2010/0109486 A1 | 5/2010 | Polyakov et al. |
| 2010/0121928 A1 | 5/2010 | Leonard |
| 2010/0141608 A1 | 6/2010 | Huang et al. |
| 2010/0142516 A1 | 6/2010 | Lawson et al. |
| 2010/0162109 A1 | 6/2010 | Chatterjee et al. |
| 2010/0171719 A1 | 7/2010 | Craig et al. |
| 2010/0171720 A1 | 7/2010 | Craig et al. |
| 2010/0171729 A1 | 7/2010 | Chun |
| 2010/0177050 A1 | 7/2010 | Heubel et al. |
| 2010/0182135 A1 | 7/2010 | Moosavi |
| 2010/0182245 A1 | 7/2010 | Edwards et al. |
| 2010/0225456 A1 | 9/2010 | Eldering |
| 2010/0232107 A1 | 9/2010 | Dunn |
| 2010/0237043 A1 | 9/2010 | Garlough |
| 2010/0238367 A1 | 9/2010 | Montgomery et al. |
| 2010/0295820 A1 | 11/2010 | Kikin-Gil |
| 2010/0296248 A1 | 11/2010 | Campbell et al. |
| 2010/0298032 A1 | 11/2010 | Lee et al. |
| 2010/0302199 A1 | 12/2010 | Taylor et al. |
| 2010/0321335 A1 | 12/2010 | Lim et al. |
| 2011/0001613 A1 | 1/2011 | Ciesla et al. |
| 2011/0011650 A1 | 1/2011 | Klinghult |
| 2011/0012851 A1 | 1/2011 | Ciesla et al. |
| 2011/0018813 A1 | 1/2011 | Kruglick |
| 2011/0029862 A1 | 2/2011 | Scott et al. |
| 2011/0043457 A1 | 2/2011 | Oliver et al. |
| 2011/0060998 A1 | 3/2011 | Schwartz et al. |
| 2011/0074691 A1 | 3/2011 | Causey et al. |
| 2011/0102462 A1 | 5/2011 | Birnbaum |
| 2011/0120784 A1 | 5/2011 | Osoinach et al. |
| 2011/0148793 A1 | 6/2011 | Ciesla et al. |
| 2011/0148807 A1 | 6/2011 | Fryer |
| 2011/0157056 A1 | 6/2011 | Karpfinger |
| 2011/0157080 A1 | 6/2011 | Ciesla et al. |
| 2011/0163978 A1 | 7/2011 | Park et al. |
| 2011/0175838 A1 | 7/2011 | Higa |
| 2011/0175844 A1 | 7/2011 | Berggren |
| 2011/0181530 A1 | 7/2011 | Park et al. |
| 2011/0193787 A1 | 8/2011 | Morishige et al. |
| 2011/0194230 A1 | 8/2011 | Hart et al. |
| 2011/0234502 A1 | 9/2011 | Yun et al. |
| 2011/0241442 A1 | 10/2011 | Mittleman et al. |
| 2011/0242749 A1 | 10/2011 | Huang et al. |
| 2011/0248987 A1 | 10/2011 | Mitchell |
| 2011/0254672 A1 | 10/2011 | Ciesla et al. |
| 2011/0254709 A1 | 10/2011 | Ciesla et al. |
| 2011/0254789 A1 | 10/2011 | Ciesla et al. |
| 2011/0306931 A1 | 12/2011 | Kamen et al. |
| 2012/0032886 A1 | 2/2012 | Ciesla et al. |
| 2012/0038583 A1 | 2/2012 | Westhues et al. |
| 2012/0043191 A1 | 2/2012 | Kessler et al. |
| 2012/0044277 A1 | 2/2012 | Adachi |
| 2012/0056846 A1 | 3/2012 | Zaliva |
| 2012/0062483 A1 | 3/2012 | Ciesla et al. |
| 2012/0080302 A1 | 4/2012 | Kim et al. |
| 2012/0098789 A1 | 4/2012 | Ciesla et al. |
| 2012/0105333 A1 | 5/2012 | Maschmeyer et al. |
| 2012/0120357 A1 | 5/2012 | Jiroku |
| 2012/0154324 A1 | 6/2012 | Wright et al. |
| 2012/0193211 A1 | 8/2012 | Ciesla et al. |
| 2012/0200528 A1 | 8/2012 | Ciesla et al. |
| 2012/0200529 A1 | 8/2012 | Ciesla et al. |
| 2012/0206364 A1 | 8/2012 | Ciesla et al. |
| 2012/0218213 A1 | 8/2012 | Ciesla et al. |
| 2012/0218214 A1 | 8/2012 | Ciesla et al. |
| 2012/0223914 A1 | 9/2012 | Ciesla et al. |
| 2012/0235935 A1 | 9/2012 | Ciesla et al. |
| 2012/0242607 A1 | 9/2012 | Ciesla et al. |
| 2012/0306787 A1 | 12/2012 | Ciesla et al. |
| 2013/0019207 A1 | 1/2013 | Rothkopf et al. |
| 2013/0127790 A1 | 5/2013 | Wassvik |
| 2013/0141118 A1 | 6/2013 | Guard |
| 2013/0215035 A1 | 8/2013 | Guard |
| 2013/0275888 A1 | 10/2013 | Williamson et al. |
| 2014/0043291 A1 | 2/2014 | Ciesla et al. |
| 2014/0132532 A1 | 5/2014 | Yairi et al. |
| 2014/0160044 A1 | 6/2014 | Yairi et al. |
| 2014/0160063 A1 | 6/2014 | Yairi et al. |
| 2014/0160064 A1 | 6/2014 | Yairi et al. |
| 2014/0176489 A1 | 6/2014 | Park |
| 2015/0009150 A1 | 1/2015 | Cho et al. |
| 2015/0015573 A1 | 1/2015 | Burtzlaff et al. |
| 2015/0091834 A1 | 4/2015 | Johnson |
| 2015/0091870 A1 | 4/2015 | Ciesla et al. |
| 2015/0138110 A1 | 5/2015 | Yairi et al. |
| 2015/0145657 A1 | 5/2015 | Levesque et al. |
| 2015/0205419 A1 | 7/2015 | Calub et al. |
| 2015/0293591 A1 | 10/2015 | Yairi et al. |

FOREIGN PATENT DOCUMENTS

| | | |
|---|---|---|
| CN | 1882460 A | 12/2006 |
| EP | 2000884 A1 | 12/2008 |
| GB | 190403152 A | 12/1904 |
| GB | 108771 A | 8/1917 |
| GB | 1242418 A | 8/1971 |
| JP | s63164122 A | 7/1988 |
| JP | 10255106 | 9/1998 |
| JP | H10255106 | 9/1998 |
| JP | 2006268068 A | 10/2006 |
| JP | 2006285785 A | 10/2006 |
| JP | 2009064357 A | 3/2009 |
| JP | 2010039602 A | 2/2010 |
| JP | 2010072743 A | 4/2010 |
| JP | 2011508935 A | 3/2011 |
| KR | 20000010511 | 2/2000 |
| KR | 100677624 B | 1/2007 |
| KR | 20090023364 | 11/2012 |
| WO | 2004028955 A2 | 4/2004 |
| WO | 2006082020 A1 | 8/2006 |
| WO | 2008037275 A | 4/2008 |
| WO | 2009002605 A | 12/2008 |
| WO | 2009044027 A2 | 4/2009 |
| WO | 2009067572 A2 | 5/2009 |
| WO | 2009088985 A1 | 7/2009 |
| WO | 2010077382 A | 7/2010 |
| WO | 2010078596 A | 7/2010 |
| WO | 2010078597 A | 7/2010 |
| WO | 2011003113 A | 1/2011 |
| WO | 2011087816 A | 7/2011 |
| WO | 2011087817 A | 7/2011 |
| WO | 2011112984 A | 9/2011 |
| WO | 2011118382 A1 | 9/2011 |
| WO | 2011133604 A | 10/2011 |

(56) References Cited

FOREIGN PATENT DOCUMENTS

| WO | 2011133605 A | 10/2011 |
| WO | 2013173624 A2 | 11/2013 |
| WO | 2014047656 A2 | 3/2014 |

OTHER PUBLICATIONS

Essilor. "Ophthalmic Optic Files Materials," Essilor International, Ser 145 Paris France, Mar. 1997, pp. 1-29, [retrieved on Nov. 18, 2014]. Retrieved from the internet. URL: <http://www.essiloracademy.eu/sites/default/files/9.Materials.pdf>.

Jeong et al., "Tunable Microdoublet Lens Array," Optical Society of America, Optics Express; vol. 12, No. 11. May 31, 2004, 7 Pages.

Lind. "Two Decades of Negative Thermal Expansion Research: Where Do We Stand?" Department of Chemistry, the University of Toledo, Materials 2012, 5, 1125-1154; doi:10.3390/ma5061125, Jun. 20, 2012 pp. 1125-1154, [retrieved on Nov. 18, 2014]. Retrieved from the internet. URL: <https://www.google.com/webhp?sourceid=chrome-instant&ion=1&espv=2&ie=UTF-8#q=materials-05-01125.pdf>.

Preumont, A. Vibration Control of Active Structures: An Introduction, Jul. 2011.

USER INTERFACE SYSTEM

CROSS-REFERENCE TO RELATED APPLICATIONS

This application is a continuation of U.S. patent application Ser. No. 13/090,213, filed 19 Apr. 2011, which claims the benefit of U.S. Provisional Application No. 61/325,773, filed on 19 Apr. 2010, both of which are incorporated in their entireties by this reference.

This application is related to U.S. application Ser. No. 11/969,848 filed on 4 Jan. 2008 and entitled "System and Method for Raised Touch Screens", U.S. application Ser. No. 12/319,334 filed on 5 Jan. 2009 and entitled "User Interface System", U.S. application Ser. No. 12/497,622 filed on 3 Jul. 2009 and "User Interface System and Method", which are all incorporated in their entirety by this reference.

TECHNICAL FIELD

This invention relates generally to touch sensitive user interfaces, and more specifically to a new and useful mountable systems and methods for selectively raising portions of touch sensitive displays.

DESCRIPTION OF THE PREFERRED EMBODIMENTS

The following description of the preferred embodiments of the invention is not intended to limit the invention to these preferred embodiments, but rather to enable any person skilled in the art to make and use this invention.

Figure 1:
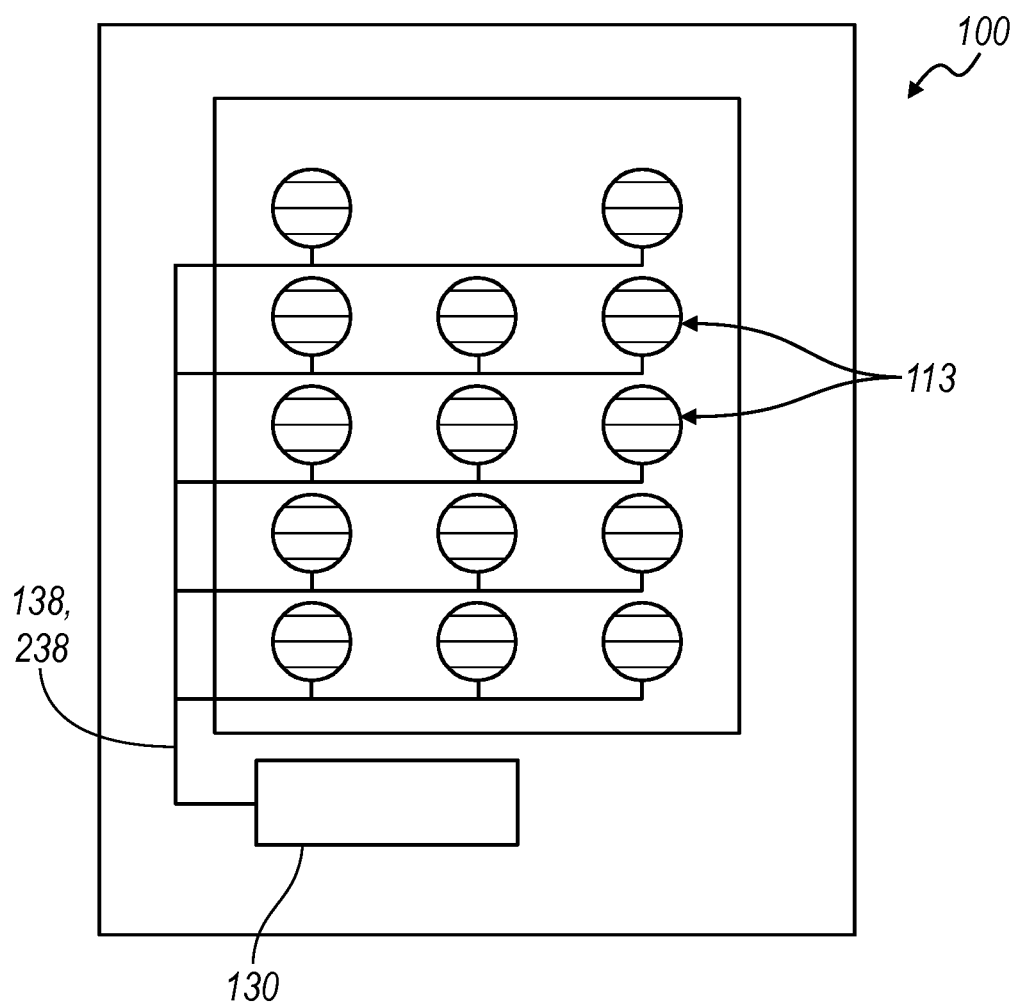
FIG. 1 is a top view of the user interface system of a preferred embodiment.
Figure 2:
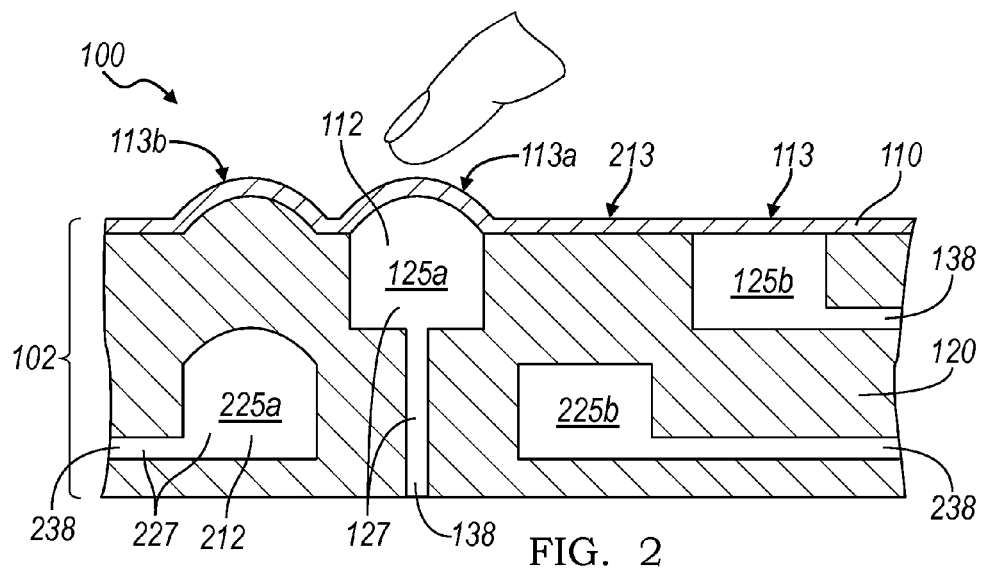
FIG. 2 is a cross-sectional view illustrating the operation of a button array of a first preferred embodiment
Figure 3:
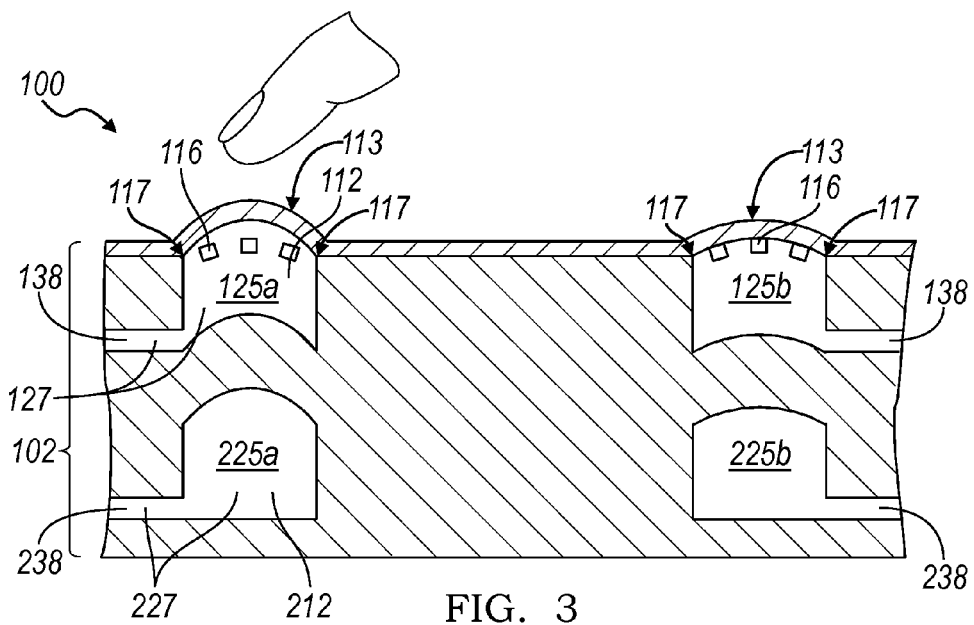
FIG. 3 is a cross-sectional view illustrating the operation of a button array of a second preferred embodiment.

As shown in FIGS. 1-3, the user interface system 100 of the preferred embodiments includes a sheet 102 that defines a surface 115 and at least partially defines a first level fluid vessel 127 at a first level within the sheet 102 and a second level fluid vessel 227 arranged at a second level within the sheet, wherein both the first and second fluid vessels 127 and 227 are arranged underneath the surface; a first volume of fluid 112 contained within the first level fluid vessel 127; and a second volume of fluid 212 contained within the second level fluid vessel 227. The user interface system 100 further includes a displacement device coupled to the first and second fluid vessels 127 and 227 that selectively manipulates the first and second volumes of fluid 112 and 212, thereby either deforming a first and second particular region of the surface 113a and 113b, respectively (in the first preferred embodiment, as shown in FIG. 2) or deforming a particular region of the surface 115 to a first and second stage, respectively (in a second preferred embodiment, as shown in FIG. 3). The first and second stage may differ in height and/or magnitude of the deformation in the particular region 113 (as shown in FIG. 3), but may alternatively differ in the surface area of the deformed particular region, as shown in FIG. 7. Alternatively, the first and second stage may differ in height difference between a first and second portion of the surface 115. For example, the first stage may expand a first particular region to rise above of the surface while the second stage may deflate a second particular region substantially adjacent to the first particular region to go below the surface, increasing the height difference between the first particular region and the substantially adjacent second particular region. However, the first and second stage may differ in any other aspect of the deformed particular region. The user interface system 100 may also include a third level cavity that is preferably located at a third level within the sheet to achieve a third stage of deformation of the particular region 113 or to deform a third particular region 113. In each of the variations of the first, second, and third level fluid vessels as described above, a portion of each of the fluid vessels may be arranged along the same plane within the sheet 102, for example, as shown in FIG. 8. However, the user interface system may include any other suitable number or combination of fluid vessels on different height levels and different locations relative to the surface 115 within the user interface system.

The user interface system 100 of the preferred embodiments has been specifically designed to be attached or appended to the user interface of an electronic device, more preferably in an electronic device that utilizes a touch sensitive display as the main means to receive user input. In this variation, the sheet 102 and the first and second volumes of fluid 112 and 212 preferably cooperate to allow the transmission of an image from the display through user interface system 100 without substantial visual obstruction. The device may be, for example, a laptop computer, a tablet computer, a mobile phone, a PDA, a personal navigation device, a remote control, a personal media player, a camera, a trackpad, a dashboard in a car, or a keyboard. However, the user interface system 100 may be used with a device that does not include a display, for example, a steering wheel, a watch, a radio, or a hand held remote. The user interface enhancement system 100 may, however, be used as the user interface for any suitable device that interfaces with a user in a tactile and/or visual manner. As described in U.S. application Ser. Nos. 11/969,848 and 12/319,334, the surface 115 of the user interface enhancement system 100 preferably remains flat until tactile guidance is to be given to the user in the location of the particular region 113. The displacement device 130 then preferably expands a portion of the first level fluid vessel 127 and/or the second level fluid vessel 227 to deform the particular region 113 outward, forming a deformation that may be seen and/or felt by a user, and providing tactile guidance for the user. The expanded particular region 113 preferably also provides tactile feedback to the user when he or she applies force onto the particular region 113 to provide input. Tactile feedback may be in the form of Newton's third law, where an applied force has an equal and opposite reaction force, but may alternatively be any other suitable type of tactile feedback. Alternatively, the displacement device 130 may retract a portion of the first level fluid vessel 127 and/or the second level fluid vessel 227 to deform the particular region 113 inward. However, any other suitable deformation of the particular region 113 may be used.

Figure 6:
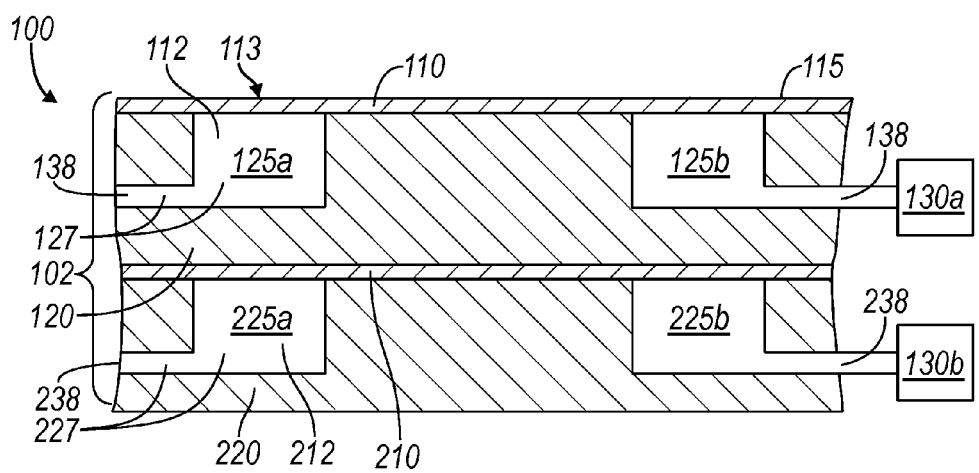
FIG. 6 is a schematic representation of the first variation of the second preferred embodiment as applied to a third variation of the sheet.

In the preferred embodiments, the first and second fluid vessels 127 and 227 are preferably substantially identical aside from the arrangement of the fluid vessel within the sheet 102 and are preferably of the type of fluid vessel as described in U.S. application Ser. Nos. 11/969,848 and 12/319,334. The first and second fluid vessels 127 and 227 each preferably include at least one first level cavity 125 and second level cavity 225, respectively, and the displacement device 130 preferably influences the volumes of fluid 112 and 212 within the cavities 125 and 225 to expand and retract the each of the cavities 125 and 225 independently of each other. As shown in FIG. 4, the user interface system 100 may further include a valve 139 that functions to direct fluid within the user interface system 100 and preferably cooperates with the displacement device 130 to manipulate the fluid within the first and second fluid vessels 127 and 227. In this variation, the first and second volumes of fluid 112 and 212 may intermix. Alternatively, as shown in FIG. 6, the displacement device 130 may include a first displacement device 130a that functions to manipulate the first volume of fluid 112 and a second displacement device 130b that functions to manipulate the second volume of fluid 212. However, any other suitable arrangement of the displacement device 130 to manipulate the first and second volumes of fluid 112 and 212 substantially independently of each other may be used.

The fluid vessels 127 and 227 may alternatively each include a first level channel 138 and second level channel 238, respectively, or a combination of a channel 138 and a cavity 125 and channel 238 and cavity 225. Each of the fluid vessels 127 and 227 may also include a second cavity 125b and 225b in addition to a first cavity 125a and 225a. The second cavities 125b and 225b are preferably similar or identical to the cavities 125a and 225a, but may alternatively be any other suitable kind of cavity. When the second cavity 125b and/or 225b are expanded, a second particular region 113 on the surface 115 is preferably deformed. The displacement device 130 preferably also influences the first volume of fluid 112 within the second cavity 125b independently of the first cavity 125a and the second volume of fluid 212 within the second cavity 225b independently of the first cavity 225a. However, any other suitable arrangement of the first and second fluid vessels 127 and 227 and the displacement device 130 may be used.

The first and second volumes of fluid 112 and 212 of the preferred embodiments are preferably substantially similar, for example, a fluid that is index matched with the sheet to allow an image to pass through the sheet without substantial visual obstruction, as described in U.S. application Ser. Nos. 11/969,848 and 12/319,334. Alternatively, the first and second volumes of fluid 112 and 212 may be substantially different. For example, one of the first and second volumes of fluid may be index matched to the sheet 102 while the other of the first and second volumes of fluid may be another type of fluid that may not be index matched but that does not substantially change light that passes through. For example, in the variation as shown in FIG. 7d, the first volume of fluid 112 may be air while the second volume of fluid 212 may be a fluid that is index matched to the sheet 102. In this variation, the thickness of the first volume of fluid 112 is preferably small such that the affect on the passage of light through the air is substantially low and optical distortion is substantially zero. However, any other suitable type of fluid may be used for the first and second volumes of fluid 112 and 212.

The sheet 102 of the user interface system 100 of the first and second preferred embodiments may be any one of the following variations or any other suitable combination of the following variations. In a first variation, as shown in FIGS. 2-4, the sheet 102 may include a substrate 120 that at least partially defines both the first and second fluid vessels 127 and 227 and a layer 110 arranged above the substrate that defines the surface. The layer 110 may also function to cooperate with the substrate to define at least one of the fluid vessels 127 and 227. In a second variation, as shown in FIG. 5, the sheet 102 may include a first substrate 120 that at least partially define the first level cavity 125 and a second substrate 220 that at least partially define the second level cavity 225. In a third variation, as shown in FIG. 6, sheet 102 may also include a second layer 210 located in between the first and second level fluid vessels 127 and 227 (and in between the first and second substrates 120 and 220 in the second variation). The user interface system 100 of this variation may also include a second displacement device 130b that is coupled to the second level fluid vessel 227 through a second channel 238. The second layer 210 may function to support the first substrate 120 and/or to partially define the second level cavity 225. The multiple substrates and/or layers in the second and third variations may be particularly useful in composing a sheet that includes a plurality of different materials, for example, materials with different degrees of pliability to allow for a first and second particular region to be deformed and/or to allow deformation of a particular region to a first and second stage.

Figure 7A:
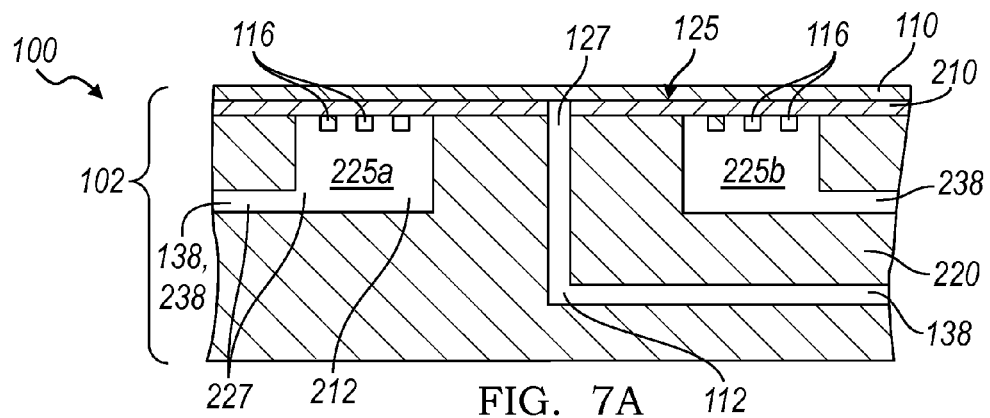
FIGS. 7a-7d are schematic representations the second variation of the second preferred embodiment as applied to a fourth variation of the sheet that includes a different number of first level cavities and second level cavities.
Figure 7B:
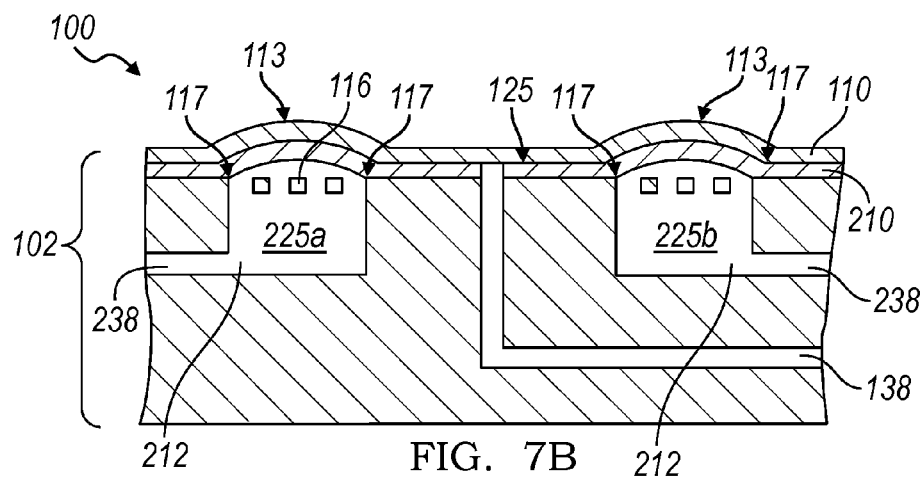
Figure 7C:
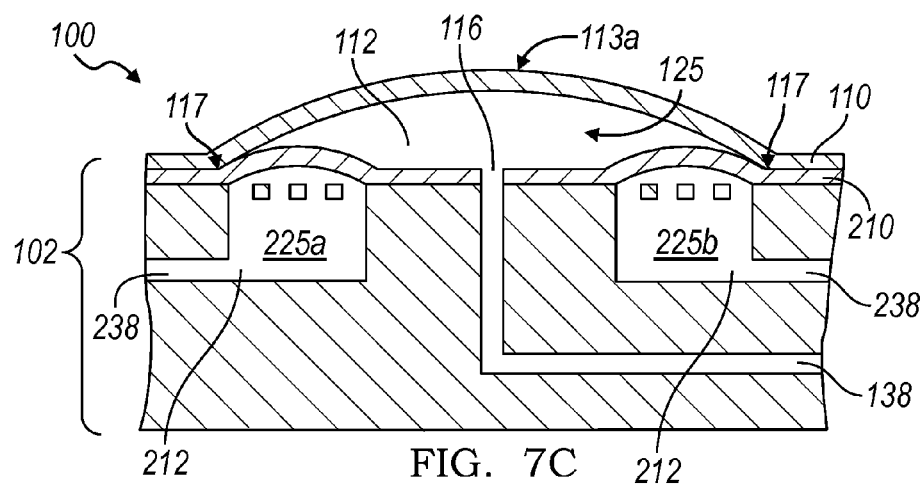
Figure 7D:
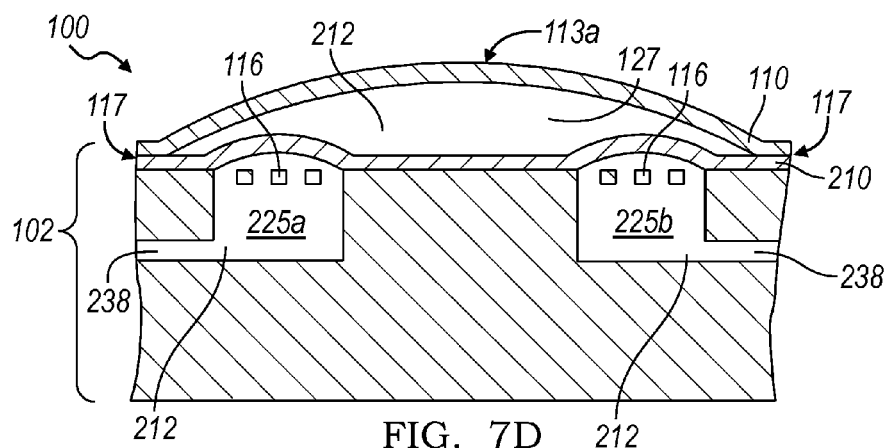
Figure 8:
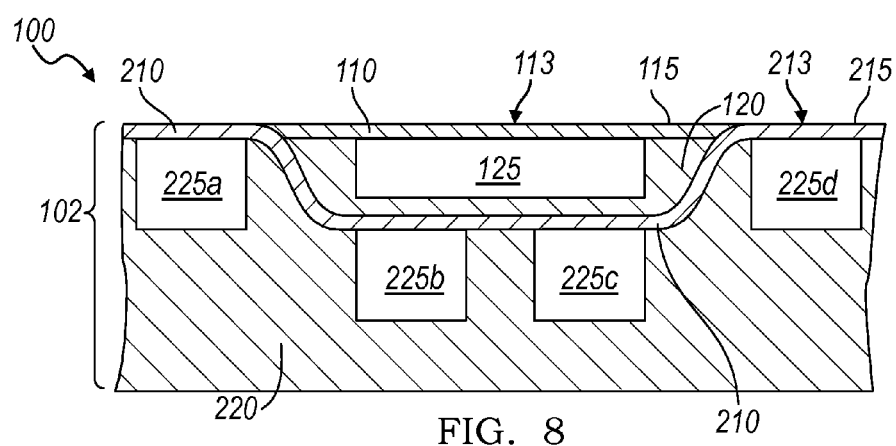
FIG. 8 is a schematic representation of the second variation the second preferred embodiment as applied to a fifth variation of the sheet that includes a different number of first level cavities and second level cavities.

In a fourth variation, as shown in FIGS. 7a-7c, sheet 102 includes a first layer 110 and a second layer 210 that cooperatively define a first level fluid vessel 127. In this variation, the boundaries of the cavity 125 of the first level fluid vessel 127 are defined by where the first and second layers 110 and 210 are attached (in other words, at an attachment point 117 as described below) to each other and the cavity 125 is a location where the first and second layers 110 and 210 are not attached to each other. The location of the attachment point 117 between the first and second layers 110 and 210 may be substantially adjacent to the first and second cavities 225a and 225b, as shown in FIGS. 7b and 7c, allowing the first layer 110 to follow the shape of the second layer 210 substantially closely. Alternatively, as shown in FIG. 7d, the location of the attachment point 117 may be substantially removed from the first and second cavities 225a and 225b, allowing the first layer 110 to follow the shape of the second layer 210 substantially loosely. However, any other suitable location of the attachment point 117 may be used. A first channel 138 allows fluid to flow into the space in between the first and second layers 110 and 210 at an unattached location, expanding the cavity 125. The sheet 102 of the fourth variation may also include a second substrate 220 that at least partially defines a second level fluid vessel 227. As shown in FIGS. 7a-7c, the substrate 120 of this variation may also function to define a portion of the first fluid vessel 127, such as a first channel 138. Alternatively, as shown in FIG. 7d, the first level fluid vessel 127 may be substantially fully defined within the space between the first and second layers 110 and 120 without an additional first channel 138 defined within the sheet. In this variation, flow of fluid may be substantially prevented from entering into the space between the first and second layers 110 and 210, resulting in the first layer 110 substantially following the shape of the second layer 210 (as shown in FIG. 7b). Alternatively, the attachment between the first and second layers 110 and 210 may include a fluid inlet that allows fluid from a reservoir or the ambient environment (such as air) to enter into the space between the first and second layers 110 and 210, allowing the first layer 110 to move with the second layer 210 without substantially following the shape of the second layer 210, as shown in FIG. 7d. This variation may alternatively thought of as including a passive displacement device 130 that allows fluid flow into and out of the space between the first and second layers 110 and 210 when there is a pressure difference between a reservoir and/or the ambient environment and the space between the first and second layers 110 and 210. However, any other suitable arrangement of the fluid flow between the first and second layers 110 and 210 of this fourth variation may be used.

In a fifth variation, as shown in FIG. 8, a portion of second layer 210 may function to define a second surface 215. The second surface 215 may be substantially planar to the surface 115, but may alternatively be on a substantially different plane. However, any other suitable combination of layers, substrates, and/or displacement devices may be used. The layer 110 in the above variations is preferably of an elastic material as described in U.S. application Ser. Nos. 11/969,848 and 12/319,334. The substrate 120 is preferably also of the material as described in U.S. application Ser. Nos. 11/969,848 and 12/319,334, but may alternatively be any other suitable type of material or combination of materials.

In the above variations, the sheet 102 may also include a support portion, as shown in FIGS. 3 and 7, that functions to support the surface 115 and to substantially prevent inward deformation of the surface 115. In particular, in the variation of the sheet 102 with a layer 110, the support portion functions to substantially prevent the layer 110 from depressing into the fluid vessel 127 and/or 227 and to provide a substantially flat surface for the user. The support portion preferably includes fluid outlets 116 that allow fluid to pass through to deform the particular region 113. The support portion may be integrated into the substrate 120 and/or substrate 220, or may alternatively be a support layer that is separate from both the substrate 120 and/or substrate 220 and the layer 110. In this variation, the support layer is preferably arranged in between the layer 110 and the substrate 120 and/or substrate 220. However, any other suitable type and arrangement of the support portion may be used.

In the above variations, the layer 110 is preferably attached to the substrate 120 (or support layer) at an attachment point 117 that at least partially defines the size and/or shape of the particular region 113. In other words, the attachment point 117 functions to define a border between a deformable particular region 113 of the surface 115 and the rest of the surface 115 and the size of the particular region 113 is substantially independent of the size of the cavity 124 and/or the channel 138. The attachment point 117 may be a series of continuous points that define an edge, but may alternatively be a series of non-continuous points. The attachment point 117 may be formed using, for example, adhesive, chemical bonding, welding, or any other suitable attachment material and/or method. The method and material used to form the attachment point 117 is preferably of a similar optical property as the layer 110 and the substrate 120, but may alternatively be of any other optical property. Other portions of the layer 110 and substrate 120 not corresponding to a particular region of the surface 113 may also be adhered using similar or identical materials and methods to the attachment point 117. Alternatively, the layer 110 and substrate 120 may be left unattached in other portions not corresponding to a particular region of the surface 113. However, the sheet 102 may be arranged in any other suitable manner.

The second layer 210, second substrate 220, second displacement device 130b, and second channel 238 are preferably of the same type as the layer 110, substrate 120, displacement device 130, and channel 138, respectively. The second substrate 220, the second layer 210, and the second displacement device 130b may, however, have different characteristics from the substrate 120, the layer 110, and the displacement device 130. For example, the second substrate 220 may be of a different elasticity from the substrate 120, the second layer 210 may be of a different material than the layer 110 (for example, one that is better suited to support the substrate 120), the second displacement device 130b may have different pressure ranges or displace a different range of fluid than the displacement device 130, and the second channel 238 may be of a different diameter than the channel 138. However, the second substrate 220, the second layer 210, and the second displacement device 130b may also be substantially different from the substrate 120, the layer 110, and the displacement device 130 respectively.

As described above and shown in FIG. 2, the displacement device 130 of the first preferred embodiment functions to manipulate the volumes of fluid within the first and second level fluid vessels 127 and 227 to deform a first and second particular region of the surface 113a and 113b. This first preferred embodiment is particularly useful in providing an increased density of deformed particular regions 113 to the user interface system 100. For example, the expandable regions of the first level fluid vessel 127 may have a limit to how close they may be to each other along the first level fluid vessel 127. By arranging a second level fluid vessel 227 that is substantially identical to the first level fluid vessel 127 at a level that is substantially different from the first level fluid vessel 127 and arranging the expandable regions of the second level fluid vessel 227 to be staggered with those of the first level fluid vessel 127, the density of the resulting deformed particular regions 113 may double. The second level fluid vessel 227 is preferably arranged at a level below the first level fluid vessel 127. In this variation of the first preferred embodiment, the second level fluid vessel 227 functions to deform a substantially thicker section of the sheet 102 to produce a deformed particular region 113b than the first level fluid vessel 127. The displacement device 130 may function to deform the deformable portion of the second level fluid vessel 227 to a higher degree than the first level fluid vessel 127 to result in a deformed particular region 113b that is substantially similar to the deformed particular region 113a. Alternatively, the portion of the sheet 102 directly above the deformable portion of the second level fluid vessel 227 may be of a material that is substantially more pliable than the portion of the sheet 102 directly above the deformable portion of the first level fluid vessel 127. However, any other suitable arrangement of the sheet 102 may be used.

As described above, the displacement device 130 of the second preferred embodiment functions to manipulate the volumes of fluid within the first and second level fluid vessels 127 and 227 to deform a particular region 113 of the surface to a first and second stage. In a first variation of the second preferred embodiment, the second stage of deformation may be different from the first stage of deformation in height; for example, the height of deformation is higher relative to the surface 115 in the second stage than in the first stage, as shown in FIGS. 3-6. In a second variation, as shown in FIG. 7, the width of the deformation is also different in the second stage; in particular, the width is wider in the second stage than in the first stage. Here, the second stage of deformation may be thought of as merging the individual expansions of the first stage of deformation, thus bridging the gap between two individually deformed particular regions of the surface 113. However, the second stage of deformation may be different from the first stage of deformation in any other suitable way. The displacement device may expand the first level cavity 125 (or any other suitable portion of the first level fluid vessel 127) first to achieve a first stage of deformation in the particular region 113 and then expand the second level cavity 225 (or any other suitable portion of the second level fluid vessel 227) to achieve a second stage of deformation of the particular region 113, but may alternatively expand the first level cavity 125 first to achieve the first stage of deformation and then expand the second level cavity 125 to achieve the second stage of deformation, as shown in FIGS. 4b, 4c and 7. Additional variation of deformation may be achieved by varying the volume of fluid that is displaced to the first and second level cavities 125 and 225 by the displacement device 130. However, any other suitable sequence of expansion may be used.

Figure 4A:
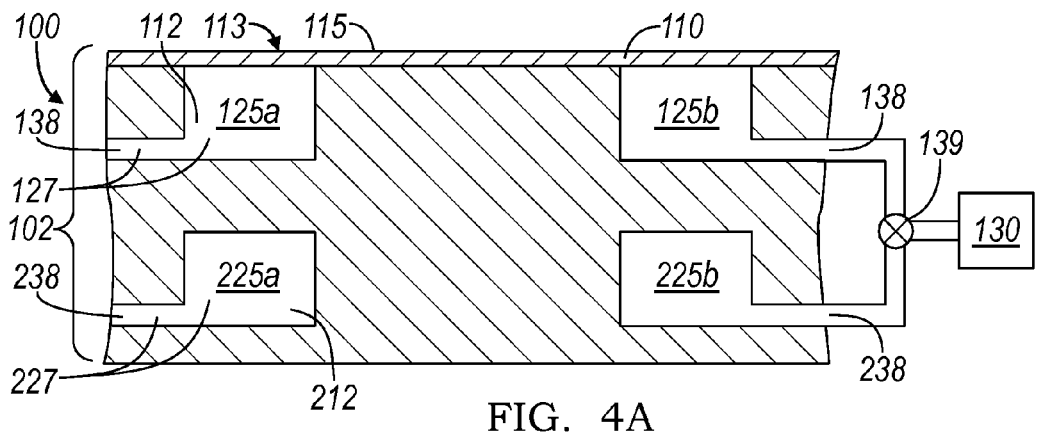
FIGS. 4a-4c are cross-sectional views of the retracted, first stage extended, and second stage extended modes of a first variation of the second preferred embodiment as applied to a first variation of the sheet.
Figure 4B:
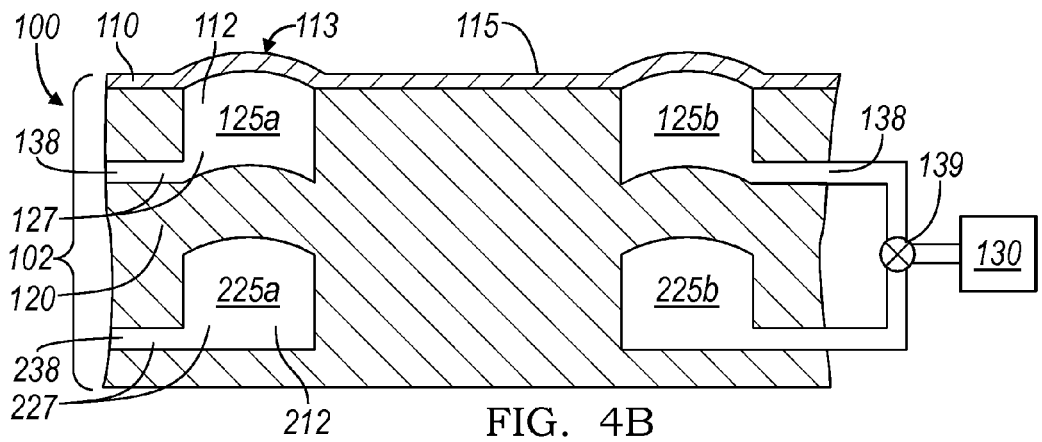
Figure 4C:
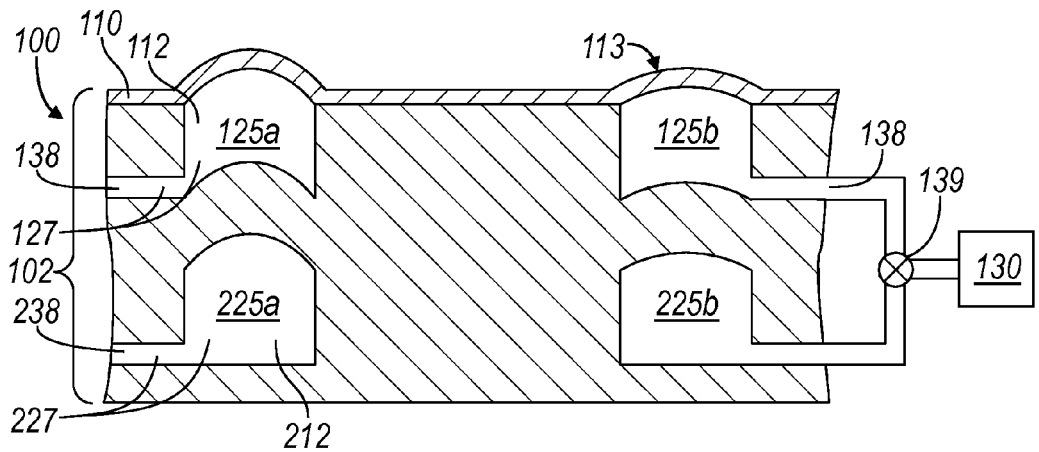
Figure 5:
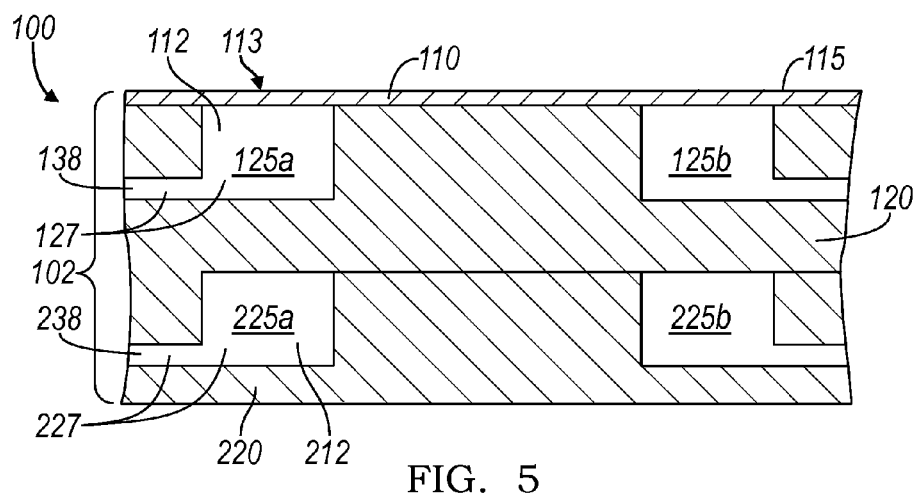
FIG. 5 is a schematic representation of the first variation of the second preferred embodiment as applied to a second variation of the sheet.

As shown in FIGS. 4a-4c, in the first variation of the second preferred embodiment as applied to the first variation of the sheet 102, the second level cavity 225 may be expanded to provide a first stage of deformation to the particular region 113. The expansion of the second level cavity 225 preferably deforms the substrate 120 internally, and the deformation of the substrate 120 preferably translates into a deformation of the bottom of the first level cavity 125 (shown in FIG. 4b). The volume of fluid contained within the first level cavity 125 is preferably substantially incompressible and of a constant volume, allowing deformation of the bottom of the first level cavity 125 to cause deformation of the layer 110 and deforming the particular region of the surface 113. The cumulative pressure necessary to deform the substrate 120 internally as well as deform the layer 110 (more specifically, the particular region 113) is preferably less than the pressure necessary to deform the bottom of the second level cavity 225 to allow the expansion of the second level cavity 225 to deform the particular region 113 and not to deform the bottom of the second level cavity 225. Additionally, the pressure necessary to deform the substrate 120 internally is preferably higher than the pressure provided by a user during use of the user interface system 100 to provide a surface 115 that feels flat to the user unless a cavity 125/225 is deformed. To achieve the second stage of deformation of the particular region 113, the first level cavity 125 is preferably expanded, providing additional deformation of the particular region 113 (shown in FIG. 4c). Similar to the pressure balance with regard to the expansion of the second level cavity 225, the pressure necessary to further deform the particular region 113 is preferably less than the cumulative pressure necessary to deform the bottom of the first level cavity 125, the substrate 120 internally, and the bottom of the second level cavity 225 to allow the expansion of the first level cavity 125 to further deform the particular region 113 and not to deform the bottom of the first level cavity 125. Alternatively, the first level fluid cavity 125 may be deformed to achieve the first stage of deformation and the second level fluid cavity 225 may be deformed to achieve the second stage of deformation. However, any other sequence in the first and second stage deformation may be used.

As shown in FIGS. 7a-7d, in the second variation of the second preferred embodiment as applied to the fourth variation of the sheet 102, the second level cavity 225 may be expanded to deform both the first and second layers 110 and 210 to achieve the first stage of deformation. To achieve the second stage of deformation of the particular region 113, the first level cavity 125 is preferably expanded, providing additional deformation of the particular region 113. In the variation as shown in FIG. 7c, the additional deformation of the particular regions 113 results in a larger deformation of a particular region 113a. Similar to the pressure balance as described above, the pressure necessary to further deform the particular region 113a is preferably less than the cumulative pressure necessary to deform the bottom of the first level cavity 125 (in other words, the second layer 110) and the bottom of the second level cavity 225 to allow the expansion of the first level cavity to further deform the particular region 113a and not to deform the bottom of the first level cavity 125.

The second level fluid vessel 227 may be arranged substantially underneath the first level fluid vessel 127. In this variation, the distance in height along the sheet 102 between the top of the second level fluid vessel 227 and the bottom of the first level fluid vessel 127 is preferably determined by the desired pressure necessary to deform the particular region 113 to the first stage by the expansion of the second level fluid vessel 227 and the desired resistance to deformation from the expansion of the first level fluid vessel 127 to achieve the second stage of deformation. However, the distance in height may be determined using any other suitable means.

As shown in FIGS. 3-6, the number of deformable portions of the first level fluid vessel 127 (for example, first level cavities 125) is preferably equal to the number of deformable portions of the second level fluid vessel 227 (for example, second level cavities 225). More specifically, there is preferably one second level cavity 225 that is substantially adjacent (for example, directly above or diagonally above) to each first level cavity 125. However, as shown in FIGS. 7 and 8, the number of first and second level cavities 125 and 225 may be different. For example, as shown in FIGS. 7a-7c, there may be two second level cavities 225 for each first level cavity 125. As shown in FIG. 7b, as each of the second level cavities 225 is expanded, the corresponding particular regions 113 are deformed, achieving a first stage of deformation. The first level cavity 125 is then expanded to achieve a second level of deformation of a larger particular region 113a. In the variation as shown in FIG. 7, the second level cavities 225 are preferably placed symmetrically relative to the first level cavity 125, and both second level cavities 225 are preferably expanded prior to the expansion of the first level cavity 125 to achieve a substantially level second stage deformation of the particular region 113a. Alternatively, only one of the second level cavities 225 may be expanded prior to expansion of the first level cavity 125 if a non-level deformation of the particular region 113a is desired. Yet alternatively, only the first level cavity 125 may be expanded. However, any other suitable arrangement of expansions of first and second level cavities 125 and 225 may be used. In this variation, as mentioned above, the second level of deformation preferably varies from the first level of deformation in both height and width. In the variation as shown in FIGS. 7b and 7c, the total width of the second stage of deformation of the particular region 113a spans the distance between the two second level cavities 225 while the first stage of deformation of the particular region 113 is of a width substantially similar to the width of each first level cavity 125. However, the first and second stages of deformation of the particular region 113 in this variation may differ in any other suitable way. In a second example, as shown in FIG. 8, the user interface system may include a second layer 210 that functions to define a second surface 215 and to partially define an additional second level cavity 225. The second surface 215 is preferably substantially adjacent to the surface 115, and preferably substantially planar to the surface 115, but may alternatively be of any suitable arrangement relative to the surface 115. The additional second level cavity 225 may function to deform a second particular region 213 on the second surface 215. This arrangement provides the user interface system 100 with a particular region 113 capable of two stages of deformation and a second particular region 213 capable of one stage of deformation. Similarly, additional variation in deformation of the particular region 113 and the second particular region 213 may be achieved by varying the volume of fluid displaced to the cavities by the displacement device 130.

Figure 9:
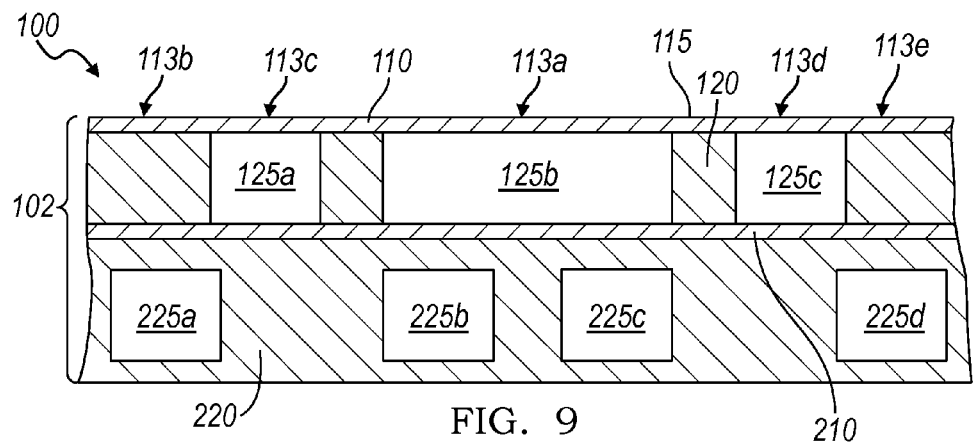
FIG. 9 is a schematic representation of a combination of the first and second preferred embodiments.

The user interface system 100 is preferably one of the embodiments and variations as described above. However, the user interface system 100 may be a combination of any of the above embodiments and variations. For example, as shown in FIG. 9, the first and second embodiments may be combined. In the central portion of the sheet 102, the first and second fluid vessels 127 and 227 may cooperate to deform a particular region 113 into a first and second stage. In the left and right regions of the sheet 102, the first and second fluid vessels 127 and 227 may cooperate to increase the density of the deformable particular regions 113 of the surface. However, any other suitable combination of the above embodiments and variations as described above may be used. Similarly, any other suitable arrangement of a first level fluid vessel 127 located at a first level within the sheet 102 and a second level fluid vessel 227 located at a second level within the sheet 102 may be used.

As a person skilled in the art will recognize from the previous detailed description and from the figures and claims, modifications and changes can be made to the preferred embodiments of the invention without departing from the scope of this invention defined in the following claims.

We claim:

1. A user interface system comprising:
   a layer defining a surface and an attachment surface and comprising a deformable portion;
   a first substrate comprising a particular portion, defining a first fluid vessel, and coupled to the layer at the attachment surface, the deformable portion of the layer and the first substrate cooperating to define a first cavity at a first depth from the surface and fluidly coupled to the first fluid vessel;
   a second substrate coupled to the first substrate and defining a second fluid vessel, the first substrate and the second substrate cooperating with the particular portion of the first substrate to define a second cavity at a second depth from the surface and fluidly coupled to the second fluid vessel; and
   a displacement device fluidly coupled to the first fluid vessel and the second fluid vessel, selectively manipulating fluid in the first fluid vessel into the first cavity to transition the deformable portion of the layer from a retracted setting to an expanded setting tactilely distinguishable from the surface, and selectively manipulating fluid in the second fluid vessel into the second cavity to deform the particular portion and the deformable portion from the retracted setting to a second expanded setting.

2. The user interface system of claim 1, further comprising a support structure arranged below the layer and supporting the layer against inward deformation of the deformable portion into the first cavity.

3. The user interface system of claim 1, further comprising a support structure arranged in the second cavity and supporting the first substrate against inward deformation into the second cavity.

4. The user interface system of claim 3, wherein the second substrate is arranged underneath the first substrate and the second cavity is substantially aligned with the first cavity.

5. The user interface system of claim 1, wherein the displacement device includes a first displacement device that manipulates the fluid in the first fluid vessel and a second displacement device that manipulates the fluid in the second fluid vessel.

6. The user interface system of claim 1, further comprising a valve that directs fluid within the first fluid vessel and the second fluid vessel that cooperates with the displacement device to manipulate the fluid within the first and second fluid vessels.

7. The user interface system of claim 1, wherein the displacement device manipulates a first volume of fluid to expand at least a portion of a first level fluid vessel to deform the particular region of the surface to a first stage, and manipulates a second volume of fluid to expand at least a portion of a second level fluid vessel to deform a particular region of the surface to a second stage.

8. A user interface system comprising:
   a layer defining a surface and an attachment surface and comprising a deformable portion;
   a first substrate defining a first fluid vessel and coupled to the layer at the attachment surface, the deformable portion of the layer and the first substrate cooperating to define a first cavity at a first depth from the surface and fluidly coupled to the first fluid vessel;
   a second substrate coupled to the first substrate and defining a second fluid vessel and a second cavity fluidly coupled to the second fluid vessel, the second substrate at a second depth from the surface; and
   a displacement device fluidly coupled to the first fluid vessel and the second fluid vessel, selectively manipulating fluid in the first fluid vessel into the first cavity to transition the deformable portion of the layer from a retracted setting to an expanded setting tactilely distinguishable from the surface, and selectively manipulating fluid in the second fluid vessel into the second cavity to deform the first substrate and the deformable portion.

9. The user interface system of claim 8, further comprising a second layer arranged in between the first and second substrates.

10. The user interface system of claim 9, wherein the second layer comprises a second deformable portion; further comprising a support structure arranged in the second cavity and supporting the second layer against inward deformation into the second cavity; wherein the displacement device displaces fluid into the second cavity to expand the second deformable portion of the second layer into the first cavity in an expanded state, the second deformable portion defining a support structure in the expanded state supporting the deformable portion of the first layer against inward deformation into the first cavity.

11. The user interface system of claim 9, wherein the second substrate is arranged underneath the first substrate and the second cavity is horizontally offset from the first cavity.

12. The user interface system of claim 11, wherein the displacement device displaces fluid into the first cavity to deform the deformable portion of the layer to a first height offset above the surface and displaces fluid into the second cavity to deform the deformable portion of the layer and the first substrate to a second height above the surface greater than the first height.

13. The user interface system of claim 9, wherein the second substrate is less pliable than a material of the first substrate and wherein the layer is more pliable than the first substrate and the second substrate.

14. The user interface system of claim 9, further comprising a display rendering a first image substantially aligned with the first cavity and a second image substantially aligned with the second cavity.

15. The user interface system of claim 9, further comprising a sensor coupled to the second substrate and outputting a signal in response to an input at the layer proximal the deformable portion.

16. The user interface system of claim 9, wherein the first substrate is of a first thickness and the second substrate is of a second thickness greater than the first thickness.

17. The user interface system of claim 16, wherein the displacement device manipulates fluid in the first cavity and the first fluid vessel at a first pressure and manipulates fluid in the second cavity and the second fluid vessel at a second pressure greater than the first pressure.

18. The user interface system of claim 9, wherein the first fluid vessel and the second fluid vessel are arranged along substantially the same plane and substantially aligned.

19. A user interface system comprising:
a layer defining a surface and an attachment surface and comprising a deformable portion;
a first substrate comprising a particular portion, defining a first fluid vessel, and coupled to the layer at the attachment surface, the deformable portion of the layer and the first substrate cooperating to define a first cavity at a first depth from the surface and fluidly coupled to the first fluid vessel;
a second substrate coupled to the first substrate and defining a second fluid vessel, the first substrate and the second substrate cooperating with the particular portion of the first substrate to define a second cavity at a second depth from the surface and fluidly coupled to the second fluid vessel, the second cavity substantially horizontally offset from the first cavity;
a displacement device fluidly coupled to the first fluid vessel and the second fluid vessel and displacing fluid into the first cavity to transition the deformable portion of the layer from a retracted setting to an expanded setting tactilely distinguishable from the surface, and selectively manipulating fluid in the second fluid vessel into the second cavity to deform the particular portion and the deformable portion from the retracted setting to a second expanded setting.

20. The user interface system of claim 19, further comprising a support structure arranged below the layer and supporting the layer against inward deformation of the particular region into the first cavity.

21. The user interface system of claim 19, further comprising a support structure arranged in the second cavity and supporting the first substrate against inward deformation into the second cavity.

* * * * *